Figure 1:
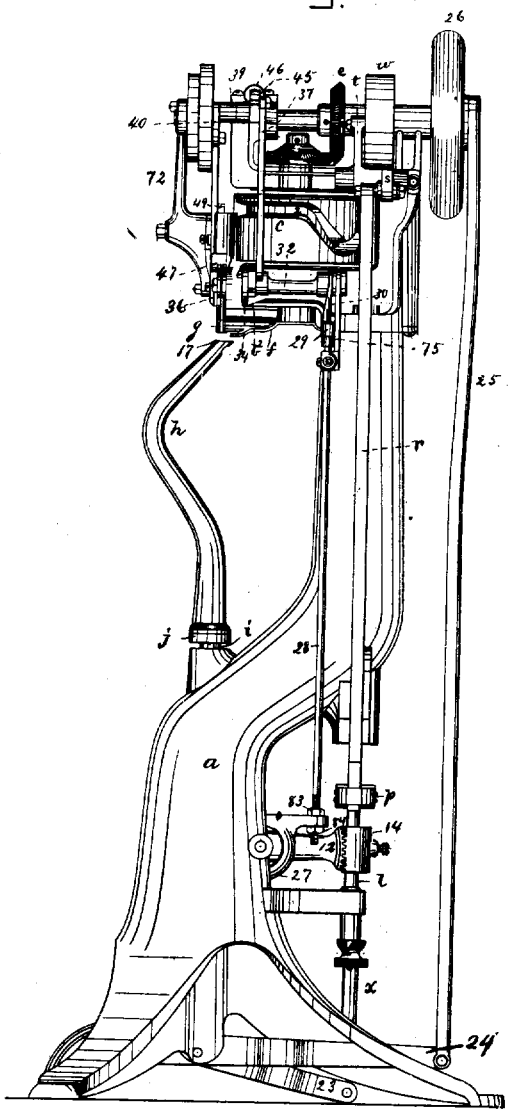

L. GODDU, 4 Sheets—Sheet 1.

Assignor to G. McKay, principal trustee, and J. W. Brooks, associate trustee of The McKay Metallic Fastening Association.

Nailing Machine.

No. 9,299. Reissued July 13, 1880.

Witnesses.
L. F. Connor.
W. D. Dearborn.

Inventor.
Louis Goddu.
by Crosby & Gregory
Attys

THE NORRIS PETERS CO., PHOTO-LITHO., WASHINGTON, D. C.

L. GODDU, 4 Sheets—Sheet 2.

Assignor to G. McKay, principal trustee, and J. W. Brooks, associate trustee of The McKay Metallic Fastening Association.

Nailing Machine.

No. 9,299. Reissued July 13, 1880.

Witnesses.

L. F. Connor

V. D. Dearborn.

Inventor

Louis Goddu, by Crosby & Gregory, Atty.

THE NORRIS PETERS CO., PHOTO-LITHO., WASHINGTON, D. C.

L. GODDU, 4 Sheets—Sheet 3.

Assignor to G. McKay, principal trustee, and J. W. Brooks, associate trustee of The McKay Metallic Fastening Association.

No. 9,299.

Nailing Machine.

Reissued July 13, 1880.

Witnesses

L. F. Connor.

W. D. Dearborn.

Inventor.

Louis Goddu.

by Crosby & Gregory Attys

L. GODDU, 4 Sheets—Sheet 4.

Assignor to G. McKay, principal trustee, and J. W. Brooks, associate trustee of The McKay Metallic Fastening Association.

Nailing Machine.

No. 9,299. Reissued July 13, 1880.

Witnesses.
L. F. Connor.
W. O. Dearborn.

Inventor.
Louis Goddu,
by Crosby & Gregory,
Attys

THE NORRIS PETERS CO., PHOTO-LITHO., WASHINGTON, D. C.

UNITED STATES PATENT OFFICE.

LOUIS GODDU, OF WINCHESTER, ASSIGNOR TO GORDON McKAY, OF CAMBRIDGE, PRINCIPAL TRUSTEE, AND JAMES W. BROOKS, OF CAMBRIDGE, MASSACHUSETTS, ASSOCIATE TRUSTEE, OF THE McKAY METALLIC FASTENING ASSOCIATION.

NAILING-MACHINE.

SPECIFICATION forming part of Reissued Letters Patent No. 9,299, dated July 13, 1880.

Original No. 215,117, dated May 6, 1879. Application for reissue filed May 10, 1880.

*To all whom it may concern:*

Be it known that I, LOUIS GODDU, of Winchester, county of Middlesex, State of Massachusetts, have invented an Improvement in Nailing-Machines, of which the following description, in connection with the accompanying drawings, is a specification.

This invention relates to improvements in nailing-machines for nailing the soles to the uppers in the manufacture of boots and shoes.

My invention has for its object the production of a machine which shall make headed nails from a wire and then drive them into the sole.

In this my improved machine I have provided instrumentalities by which to automatically determine the length of the headed nail to be formed from the wire, according to the thickness of the stock or material entering into or composing the sole of the shoe or boot being nailed. The horn has combined with it devices to always lower it a definite distance from the position it occupied when the nail was driven, notwithstanding variations in the thickness of the stock to provide for releasing the stock in order to permit it to be fed. The wire, when being formed into a nail, is first clamped at its lower end between dies, which will preferably be so made as to corrugate or indent the surface or body of the nail, after which a point-forming cutter or slide acts upon the wire a short distance above the said clamps and offsets the wire, as will be hereinafter described, so that as the said cutter descends or moves in the direction of the length of that part of the wire held clamped within the dies the said cutter will sever the said wire diagonally and force part of the metal below it into a head-forming recess at the upper side of the clamps or dies, while the end of the wire connected with the wire upon the supporting-reel will be completely forced laterally into the point-shaping recess just above the portions of the clamps which shape or grasp the body of the nail.

Figure 2:
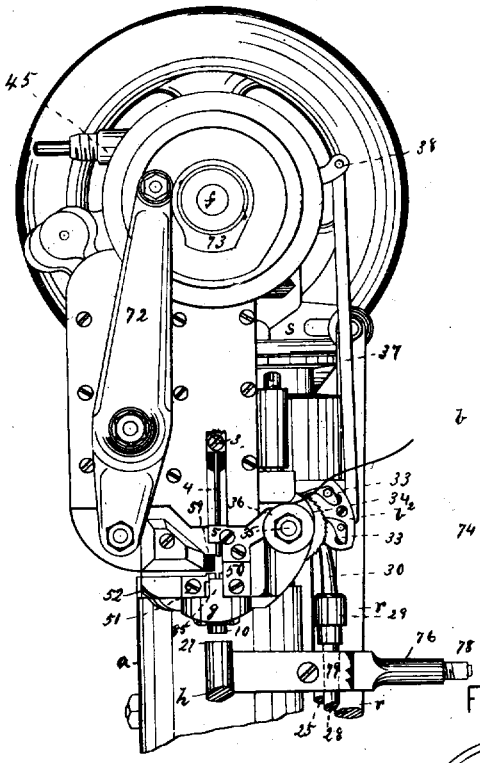
Figure 3:
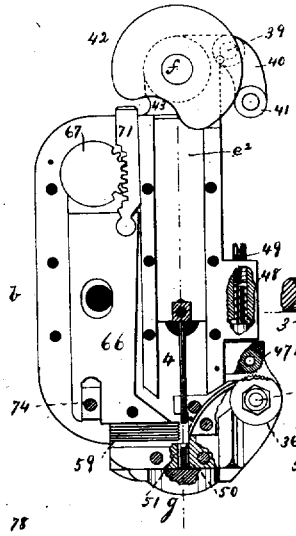
Figure 4:
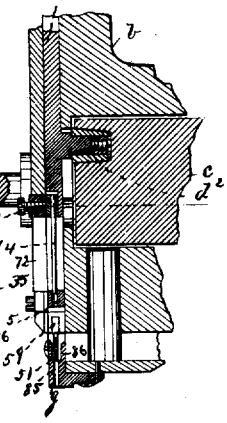
Figure 6:
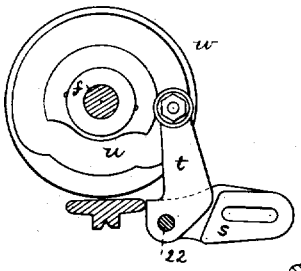
Figure 8:
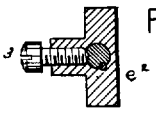
Figure 5:
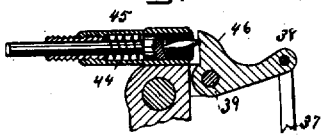
Figure 9:
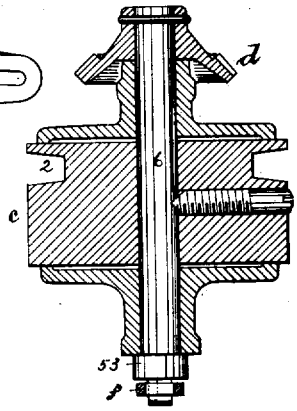
Figure 10:
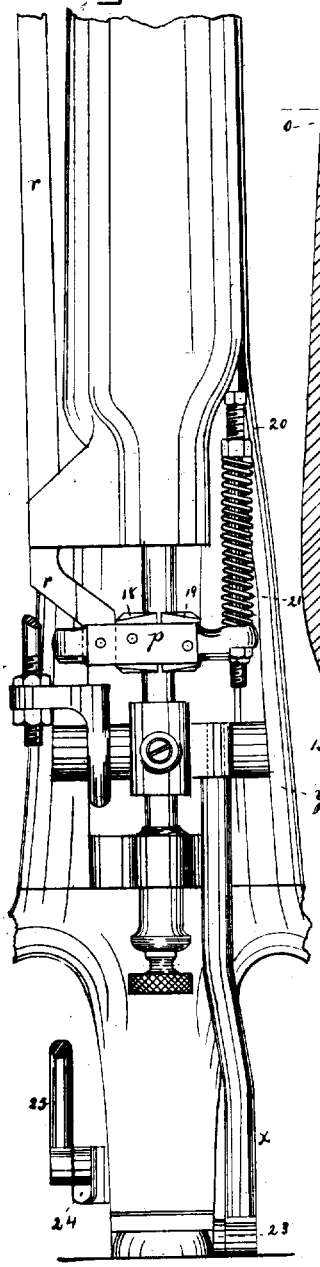
Figure 11:
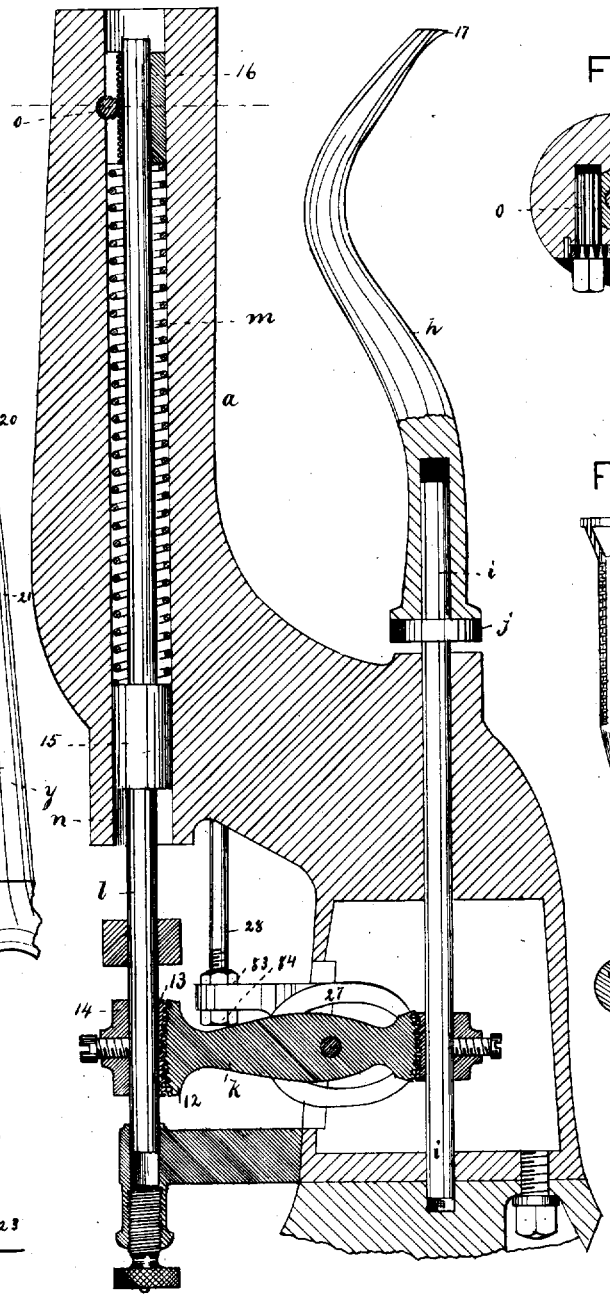
Figure 12:
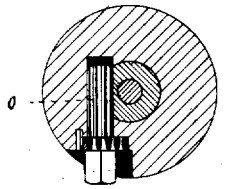
Figure 22:
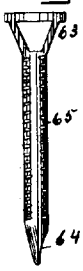
Figure 23:
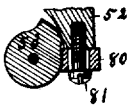
Figure 13:
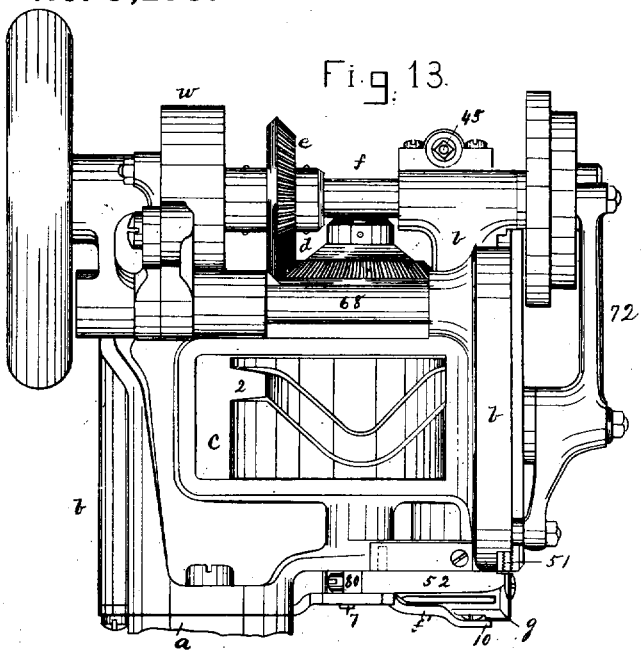
Figure 14:
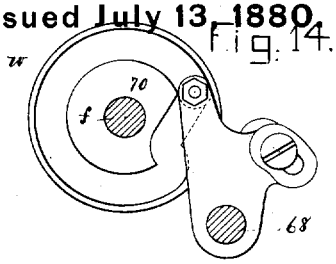
Figure 15:
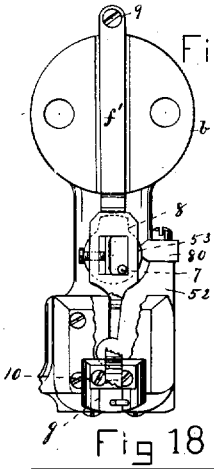
Figure 16:
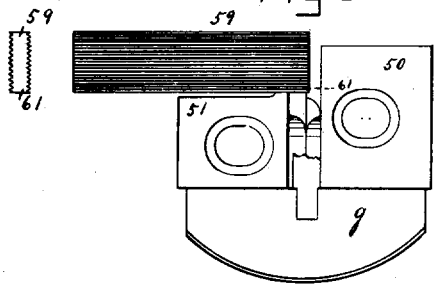
Figure 17:
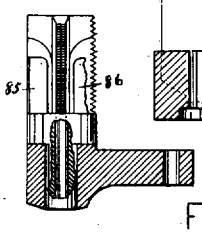
Figure 18:
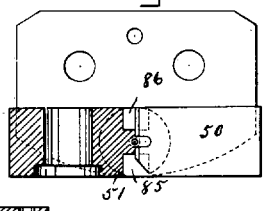
Figure 19:
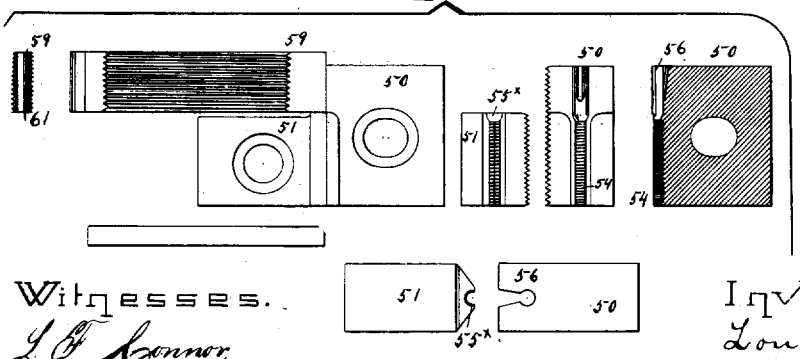
Figure 20:
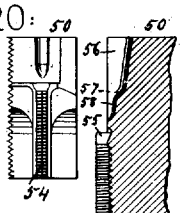
Figure 21:
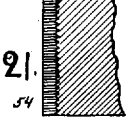

Figure 1 represents, in side elevation, a nailing-machine embodying my invention; Fig. 2, a front elevation of the upper part thereof. Fig. 3 is a view of the head of the machine, the covering or face plate being withdrawn to show the feeding mechanism, the driver-slide, and the cutter and clamps, the cutter being drawn back and elevated. Fig. 4 is a section of Fig. 3 on the dotted line thereon. Figs. 5 to 8 are details to be referred to; Fig. 9, a section of the cam for operating the nail-driver rod or bar. Fig. 10 is a rear elevation of the machine-column; Fig. 11, a vertical section thereof; Fig. 12, a cross section on the dotted line, Fig. 10; Fig. 13, a left-hand side elevation of Fig. 2. Fig. 14 is a rear-side elevation of one of the cam-hubs, its front side being shown in Fig. 6. Fig. 15 is an under-side view of Fig. 13, to show the feeding device which engages and moves the shoe, the said figure also showing the under face of the nose of the machine. Figs. 16 to 20, inclusive, represent the cutters and dies for severing and shaping the nails; Fig. 21, a section of clamp or die 50 very much enlarged beyond the scale adopted for Fig. 20. Fig. 22 shows one of the nails made by the machine herein described, the nail being shown enlarged; and Fig. 23 is a detail, to be hereinafter referred to.

The frame-work of the machine is composed of the column *a*, or base, and top part, *b*, fixed thereon. The cam-hub *c*, moved by the bevel-pinions *d e* and the main shaft *f*, receives within its cam-groove 2 the roller or stud $d^2$ of the driver-bar $e^2$, to the lower end of which, by the screw 3, is attached the driver 4, it extending into and being guided by a guide, 5, the said cam-groove raising and lowering the driver at the proper times.

The lower end of shaft 6, which carries hub *c*, is provided with an eccentric pin or projection, 7, (see Figs. 13 and 15,) which enters a hole in a slotted portion, 8, of the feeding-bar *f'*, pivoted at 9, and having a serrated surface, 10, which engages the sole-edge below the under face of the guide-nose *g*, from which the finished nail is driven by the driver directly into the sole.

The length of the feed may be varied, if desired, by making the pin 7 adjustable, or preferably by providing the portion 8 within it with a movable slide controlled by a screw, as in Fig. 15.

The horn *h* of the machine, of any usual shape, is adapted to swivel or turn freely about the upper end of the rod *i*, provided with a collar, *j*, upon which the horn rests, the said rod forming practically a part of or a continuation of the swiveling horn.

At or near the lower end of the horn-rod *i* is attached a rack, (see Fig. 11,) which by its teeth engages with the sector-shaped toothed short end of a connecting-lever, *k*, the longer end of which, toothed as at 12, engages with the rack-teeth 13 on the block 14, attached to the horn-depressing rod *l*, which is provided with a fixed collar, 15, fitted to the longitudinal passage *n* in the column, and which has its upper end extended through the bearing-sleeve 16, placed in the column. (See Fig. 11.) The rod *l* is always acted upon so as to throw it downward by a spring, *m*, which surrounds the rod and rests upon the collar 15, the force of the spring being controlled at pleasure by raising or lowering the bearing or spring controller 16 through the toothed rod *o*, which engages rack-teeth at the side of bearing 16.

The strength of the spring *m* determines the force of upward pressure of the horn end 17 against the inner sole, and consequently the force with which the stock is clamped between the horn end and guide-nose *g*. The horn end, in rising, strikes a sharp blow, which takes up and holds the "settle" of the stock.

After a nail has been driven into the shoe the rod *l* is clamped by means of the clamp *p*, composed of two pivoted blocks, 18 19, fitted within a yoke guided at one end by a rod, 20, about which is an adjustable spring, 21, that at its other end is connected with a link, *r*, adjustably held at its upper end with one arm, *s*, of a rocking lever, *s t*, the other arm, *t*, being provided with a roller or stud to enter the cam-groove *u* in the disk *w*.

The rod *l* is grasped after the nail is driven to lift it and lower the horn a definite distance from the position occupied by it when the nail was driven, the horn at that time being supported by a spring, as described. As the rod is lowered by the clamps the feed takes place, and the spring *m* is left free to act to throw the horn upward until it again pinches the stock between it and the nose *g*, the upward movement of the horn being more or less, according to the thickness of the stock.

In practice I have found it desirable to make the rod *l*, when operated upon by the clamps, of other than cylindrical form—as, for instance, triangular or waved.

The rod *l* may be lifted by a rod, *x*, which, connected with the rear end of a foot-treadle, 23, abuts against an ear, *y*, of the block 14, and consequently the horn may be thereby depressed.

A second foot-treadle, 24, one end of which is shown in Fig. 10, is, by link 25, connected with a crank on the driving-wheel 26 of the main shaft *f*, so as to rotate it; or the shaft *f* may be rotated in any usual way.

The horn-rod *i* has projecting from it a rigid arm, 27, adjustably connected with which is the regulating device to aid in governing the length of each nail according to the thickness of the stock and the position of the upper end of the horn. This regulating device is shown as a rod, 28, at the top of which is a socket-piece, 29, to receive within it a foot, 30, pivoted to an arm, 31, of a rock-shaft, 32, which at its other end has a pawl-carrying arm, $b^2$, having one or more pawls, 33, to engage the ratchet-wheel 34 on the shaft 35, which carries the lower or principal roller, 36, of the wire-feeding device. The pawl-carrier is moved from its backward or lowest position to cause the pawl to actuate the feed-wheels by means of a link, 37, connected with the end 38 (see Figs. 1 and 2) of a rock-shaft, 39, (see Fig. 3,) which has another arm, 40, provided with a roller-stud, 41, which is acted upon by a cam, 42, on the main shaft *f*, the cam being, however, so shaped as at 43 to permit the spring 44 in the tube 45 to press upon the ear 46 of the arm 38 of the rock-shaft 39 and quickly throw the pawl-carrier backward, placing its pawl in position to again engage the ratchet-wheel 34. If the backward stroke of the pawl were always the same, the nails would all be of the same length; but this backward movement of the pawl is made variable, according to the thickness of the stock, and the pawl-carrier can move backward only until the foot-piece 30 of the arm 31 of rock-shaft 32, which carries the pawl-carrier, meets the end of the regulating-rod 28, the upward termination of which is variable, according to the position of the top of the horn. In this way only sufficient length of wire for each nail, and that according to the thickness of the stock, is fed forward by the wire-feeding device.

The upper roller, 47, of the feeding device is pressed down upon the wire on the positively-moved roller 35 with more or less force by means of a spring, 48, and a screw, 49. (See Fig. 3.)

After passing between the feed-rollers the wire enters a guideway, and from it the free end of the wire is fed into and between the faces of a clamp composed of two blocks, 50 51, one of which—the one 50—is fixed, while the one 51 is movable, it being connected with a vibrating arm, 52, actuated by a cam, 53, at the lower end of shaft 6, a suitable spring moving it in the opposite direction quickly. Figs. 16 to 20 show different views of the sides, faces, and other parts of the said clamps or dies 50 51.

The clamp or die 50, composed of steel, has at its lower portion indentations 54, above it one-half (55) of the head-shaping die, then the point-shaper 58, the point offset 57, and the wire-groove 56.

The die or clamp 51 has indentations 54× and a head-shaping die, 55×, the portions 54 and 54× and 55 and 55× coming exactly opposite, clamping the wire between them and indenting or roughening its body. When these clamps 50 51 are closed upon the wire the cutter 59, made as a steel block, and being preferably flat faced, is moved forward against the wire then resting between the dies and extending through the groove 56 to the reel, and forces the wire into the groove 56, causing one side of it to assume the shape of the parts 57 58, offsetting a portion of the wire above the heading space or die 55. Then the cutter 59 is moved downward, and its lower corner, 61, cuts into and through the wire diagonally, and as the lower face of the cutter meets the top of the die 51 the cutter crowds the metal under it into the heading space or die and forms a head to correspond in shape with the spaces 55 55× and leaves the end of the wire pointed for the next nail, the point being a clinching-point.

The shape of the point and head of the nail may be varied by changing the outline of the dies.

A nail such as the machine will make is shown at Fig. 22. In that figure 63 is the head, 64 the point offset from the side of the wire, and 65 is the indented body.

The nail having been formed as described, the clamps or dies 50 51 are opened and the cutter elevated and moved back, and then the driver descends and drives the headed nail downward through the nose *g*.

The cutter 59 is attached to the slide-bar 66, which is raised and lowered by means of a vibrating toothed disk, 67, at the end of a rock-shaft, 68, set in motion by a cam, 70, on shaft *f*, (see Figs. 13 and 14,) the said disk 67 engaging the teeth of a rack, 71, pivoted to the slide-bar 66. The bar 66 is moved to press the cutter forward by means of a lever, 72, actuated by a cam, 73, the end of the lever having a pin provided with a swivel-block, 74, which enters a groove in the bar. (See Fig. 3.)

Figure 7:
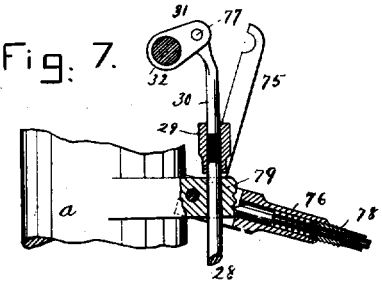

When it is desired to prevent the wire-feed from working or nails from being made the hook 75, moved by the arm 76, is turned so as to engage the pin 77 of arm 31, and the hook is locked in position by means of the spring-pawl 78, which engages a notched portion, 79, Fig. 7.

In this machine it will be seen that the horn or its end 17 is always held in position against the stock or material being nailed, the horn crowding the said stock upward against the fixed nose and clamping it, and consequently the upper end of the horn during the nailing process occupies a variable position, according to the thickness of the stock, and these various positions I herein denominate the "variable base-line;" and it will be noticed that the horn is positively lowered a fixed and uniform distance from this variable base-line to release the stock when it is to be fed.

In this machine the wire is not wasted when the head and point are formed.

The toe 80 of the lever 52 is slotted and connected with the said lever by means of a set-screw, 81, (see Fig. 23,) so that in case the driver becomes broken or caught between the dies the said toe may slip and prevent the machine being broken.

The cutter 59 is and the dies will be fluted longitudinally to meet corresponding fluted portions of the parts co-operating with them, this construction enabling the cutter and dies to be securely held in place.

To vary the extent of clinch at the point of the nail, the end must extend more or less through the stock. This variation is herein provided for by adjusting the regulating-rod 28 as to its height with relation to the top of the horn. The rod is connected with the arm 27 by nuts 83 84.

The hook device 75, to prevent the action of the feed, may be thrown into position to engage the pin 77 to stop the feed at any position of the pawl-carrier, and at the next ascent of the pawl-carrier the said hook will positively hold the feeding devices by engaging the pin 77.

The nose has above it, at front and rear, two prongs, 85 86, and the ends of the dies 50 51 next the portions 54 are reduced to enter between these prongs 85 86, the prongs acting to retain and assist in guiding the nail when the dies are retracted.

I claim—

1. In a nailing-machine to unite the uppers and soles of boots and shoes, a horn and a rigid nose above it, combined with mechanism to permit the horn to automatically adapt itself to the thickness of the stock, and with mechanism to automatically and positively depress the said horn a fixed and determined distance from the base-line, variable according to the thickness of the stock, substantially as described.

2. In a machine for uniting the uppers and soles of boots and shoes, the combination, with wire-feeding mechanism, of mechanism to sever the wire and simultaneously form the point for one and the head for another nail, substantially as described.

3. In a machine for uniting the uppers and soles of boots and shoes, the combination, with an upwardly-pressed horn made self-adapting to the thickness of the stock and wire-feeding mechanism, of connecting mechanism between the horn and feeding mechanism, to vary the length of the wire fed into the machine, to thereby automatically adapt the length of the nail to the thickness of the stock.

4. The combination, with the clamping-dies provided with head-shaping cavities to grasp and hold the wire, of a cutter to sever the wire diagonally, and to follow the upper end of the nail being severed and form an enlarged head upon it while held by the clamping-dies, substantially as described.

5. The combination, with the clamping-dies provided with a heading-cavity and a point-shaping cavity or offsetting-recess, of a cutter to first act upon the wire and bend it into the point-shaping cavity, and then cut into the wire diagonally to form an enlarged head upon and sever a nail from the length of wire, substantially as described.

6. The feeding-rollers, ratchet 34, fixed with relation to one of them, and pawl-carrier, and the pawl and its rocker-shaft, and mechanism to always throw the pawl-carrier and pawl forward to a certain fixed point, combined with a spring to throw the pawl-carrier backward and a variable stop to arrest the backward movement of the pawl-carrier according to the position of the upper end of the horn, substantially as described.

7. The combination, with clamping-dies to grasp and hold the wire and a cutter to sever and form an enlarged head, as described, on the nail to be driven, of feeding mechanism adapted to feed into the dies a variable quantity or length of wire, according to the thickness of the stock, to thereby form headed nails of different lengths as needed in stock of different thickness.

8. The combination, with the horn and regulating rod 28, and pawl-carrying rock-shaft for the feeding mechanism, of a hook to hold the pawl-carrier in elevated position and prevent the operation of the wire-feeding mechanism, substantially as described.

9. The horn, the horn-depressing rod *l*, and the connecting-lever between them, combined with the spring to depress the rod *l* and control the extent of upward pressure of the upper end of the horn against the stock, substantially as described.

10. The rod *l*, collar 15, and bearing 16, and spring *m*, combined with an adjusting device, *o*, to move the bearing and compress the spring, substantially as described.

11. The cutter-carrying bar 66 and mechanism to move it laterally to press the end of the cutter against the wire, combined with the pivoted rack 71 and the oscillating pinion 67, to permit the cutter to be moved downward, substantially as and for the purpose described.

12. The combination, with the movable die and its arm, of a slotted toe held thereto, substantially as described.

13. The cutter or die fluted at its side to enable it to be held securely and rigidly, substantially as described.

14. The nose provided with the prongs 85 86, combined with the dies, substantially as and for the purpose described.

15. In a machine for uniting the soles and uppers of boots and shoes, the following instrumentalities, viz: a horn to enter the shoe, mechanism to lower the end of the horn a fixed distance from a variable base-line, as described, a spring to lift the horn and strike or impact its end against the stock held between it and the nose preparatory to or when driving the nail, and feeding mechanism to feed a wire a variable distance in accordance with the thickness of the stock, substantially as described.

16. The horn-depressing rod, mechanism to lift and depress it, the horn, and pivoted lever connecting them, combined with an independent regulating rod or device connected with and moved by the horn to control the extent of movement of the wire-feeding mechanism and the length of the wire to be formed into a nail, substantially as described.

17. In a nailing-machine to unite the soles and uppers of boots and shoes, the following instrumentalities, viz: a rigid nose, a horn supported to automatically adapt itself to the thickness of the stock and press it against the nose, the feeding device to engage the boot or shoe supported by the horn, and means adapted, substantially as described, to depress the said horn just after the nail is driven in order to release the boot or shoe and permit the said feeding device to move it over the horn, substantially as described.

18. In a nailing-machine for uniting the soles and uppers of boots and shoes, the following instrumentalities, viz: a rigid nose above the stock, a horn to enter the stock, bear it upward against the nose, and adapt itself automatically to the varying thickness of the stock, the feeding mechanism to engage the stock, mechanism, substantially as described, to release it from the upward pressure of the horn to permit the stock to be fed forward, the driver to drive a nail or fastening, feeding mechanism to feed a wire from which the fastenings are to be made, and connecting mechanism between the horn and feeding mechanism to automatically vary the length of the feed for the length of the wire or fastening according to the varying thickness of the stock, all substantially as described.

LOUIS GODDU.

Witnesses:
GEO. W. GREGORY,
N. E. C. WHITNEY.